(12) United States Patent
Handagama et al.

(10) Patent No.: US 8,192,530 B2
(45) Date of Patent: Jun. 5, 2012

(54) SYSTEM AND METHOD FOR REGENERATION OF AN ABSORBENT SOLUTION

(75) Inventors: Nareshkumar B. Handagama, Knoxville, TN (US); Rasesh R. Kotdawala, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 99 days.

(21) Appl. No.: 12/269,389

(22) Filed: Nov. 12, 2008

(65) Prior Publication Data

US 2009/0151566 A1 Jun. 18, 2009

Related U.S. Application Data

(60) Provisional application No. 61/013,363, filed on Dec. 13, 2007.

(51) Int. Cl.
*B01D 53/14* (2006.01)
(52) U.S. Cl. ........... 95/178; 95/179; 95/181; 95/183; 95/193; 95/194; 95/209; 95/227; 95/235; 95/236; 423/228
(58) Field of Classification Search ............ 95/187, 95/227, 235, 236, 181, 183, 178, 179, 193, 95/194, 209; 96/242; 423/228
See application file for complete search history.

(56) References Cited

U.S. PATENT DOCUMENTS

| | | | |
|---|---|---|---|
| 2,487,576 A | 11/1949 | Meyers | |
| 2,608,461 A | 8/1952 | Frazier | |
| 3,255,233 A | 6/1966 | Kunze et al. | |
| 3,266,219 A * | 8/1966 | Woertz | 95/177 |
| 3,563,696 A * | 2/1971 | Benson | 423/223 |
| 3,823,222 A | 7/1974 | Benson | |
| 3,896,212 A | 7/1975 | Eickmeyer | |
| 4,160,810 A | 7/1979 | Benson et al. | |
| 5,145,658 A * | 9/1992 | Chao | 423/232 |
| 5,318,758 A | 6/1994 | Fujii et al. | |
| 5,344,627 A | 9/1994 | Fujii et al. | |
| 5,378,442 A | 1/1995 | Fujii et al. | |

(Continued)

FOREIGN PATENT DOCUMENTS

EP 0 502 596 9/1992

(Continued)

OTHER PUBLICATIONS

Japanese First Preliminary Rejection dated Sep. 9, 2011.

*Primary Examiner* — Duane Smith
*Assistant Examiner* — Tiffany N Palmer
(74) *Attorney, Agent, or Firm* — Robert D. Crawford

(57) ABSTRACT

A system (10) for regenerating a rich absorbent solution (26), the system including: an absorber (20) facilitating interaction between a process stream (22) and an absorbent solution, wherein the process stream comprises an acidic component, and interaction of the process stream with the absorbent solution produces a reduced acidic component stream (28) and a rich absorbent solution; at least one heat exchanger accepting at least one of said reduced acidic component stream and the process stream to transfer heat to a heat transfer fluid (60); and at least one mechanism (60a) to transfer the heat transfer fluid from said at least one heat exchanger to a regenerator (34) regenerating the rich absorbent solution, wherein each of the at least one mechanisms is fluidly coupled to each of the at least one heat exchangers.

20 Claims, 6 Drawing Sheets

U.S. PATENT DOCUMENTS

| | | | |
|---|---|---|---|
| 5,618,506 | A | 4/1997 | Suzuki et al. |
| 5,660,049 | A | 8/1997 | Erickson |
| 6,117,404 | A | 9/2000 | Mimura et al. |
| 6,423,282 | B1 | 7/2002 | Araki et al. |
| 6,485,547 | B1 | 11/2002 | Iijima |
| 6,645,446 | B1 * | 11/2003 | Won et al. ............ 423/210 |
| 6,674,530 | B2 | 7/2004 | Iijima |
| 6,800,120 | B1 | 10/2004 | Won et al. |
| 6,883,327 | B2 | 4/2005 | Iijima et al. |
| 7,056,482 | B2 * | 6/2006 | Hakka et al. ............ 423/230 |
| 7,316,737 | B2 | 1/2008 | Mimura et al. |
| 7,377,967 | B2 | 5/2008 | Reddy et al. |
| 2004/0226441 | A1 | 11/2004 | Palmer |
| 2006/0204425 | A1 * | 9/2006 | Kamijo et al. ............ 423/437.1 |
| 2006/0248890 | A1 | 11/2006 | Iijima et al. |
| 2007/0148069 | A1 * | 6/2007 | Chakravarti et al. ....... 423/220 |
| 2008/0056972 | A1 | 3/2008 | Iijima |
| 2008/0072762 | A1 * | 3/2008 | Gal ............ 96/242 |
| 2008/0223215 | A1 | 9/2008 | Iijima et al. |
| 2008/0317651 | A1 * | 12/2008 | Hooper et al. ............ 423/230 |
| 2009/0068078 | A1 * | 3/2009 | Grobys et al. ............ 423/220 |
| 2009/0305870 | A1 | 12/2009 | Chung |
| 2009/0308247 | A1 * | 12/2009 | Knaebel ............ 95/111 |
| 2010/0003177 | A1 * | 1/2010 | Aroonwilas et al. ....... 423/229 |
| 2010/0005722 | A1 | 1/2010 | Iijima et al. |
| 2010/0050637 | A1 | 3/2010 | Yamashita et al. |
| 2010/0062926 | A1 * | 3/2010 | Woodhouse et al. ........ 502/55 |
| 2010/0258005 | A1 | 10/2010 | Oishi et al. |
| 2010/0326074 | A1 | 12/2010 | Okita et al. |
| 2011/0033359 | A1 | 2/2011 | Papenheim et al. |
| 2011/0195005 | A1 * | 8/2011 | Hooper et al. ............ 423/228 |

FOREIGN PATENT DOCUMENTS

| | | |
|---|---|---|
| EP | 0 879 631 | 5/2002 |
| EP | 1 695 756 | 8/2006 |
| EP | 2 085 133 | 8/2009 |
| EP | 2 258 461 | 12/2010 |
| EP | 2 269 711 | 1/2011 |
| EP | 2 269 712 | 1/2011 |
| EP | 2 269 713 | 1/2011 |
| EP | 2 286 894 | 2/2011 |
| FR | 2 938 454 | 2/2010 |
| GB | 871207 | 6/1961 |
| JP | 2009214089 | 9/2009 |
| JP | 2009215186 | 9/2009 |
| WO | WO 02/09849 | 2/2002 |
| WO | WO 03/013699 | 2/2003 |
| WO | WO 2004/005818 | 1/2004 |
| WO | 2005009592 A1 | 2/2005 |
| WO | WO 2005/069965 | 8/2005 |
| WO | WO 2007/009461 | 1/2007 |
| WO | 2007019632 A1 | 2/2007 |
| WO | WO 2007/019632 | 2/2007 |
| WO | WO 2007/068733 | 6/2007 |
| WO | WO 2007/107004 | 9/2007 |
| WO | WO 2008/094777 | 8/2008 |
| WO | WO 2009/003238 | 1/2009 |
| WO | WO 2009/004307 | 1/2009 |
| WO | WO 2009/035340 | 3/2009 |
| WO | WO 2009/065218 | 4/2009 |
| WO | WO 2009/104744 | 8/2009 |
| WO | WO 2009/112518 | 9/2009 |
| WO | WO 2010/010720 | 1/2010 |
| WO | WO 2010/051604 | 5/2010 |
| WO | WO 2010/102877 | 9/2010 |
| WO | WO 2010/105754 | 9/2010 |
| WO | WO 2010/113364 | 10/2010 |
| WO | WO 2010/122830 | 10/2010 |
| WO | WO 2010/133484 | 11/2010 |
| WO | WO 2010/142716 | 12/2010 |

* cited by examiner

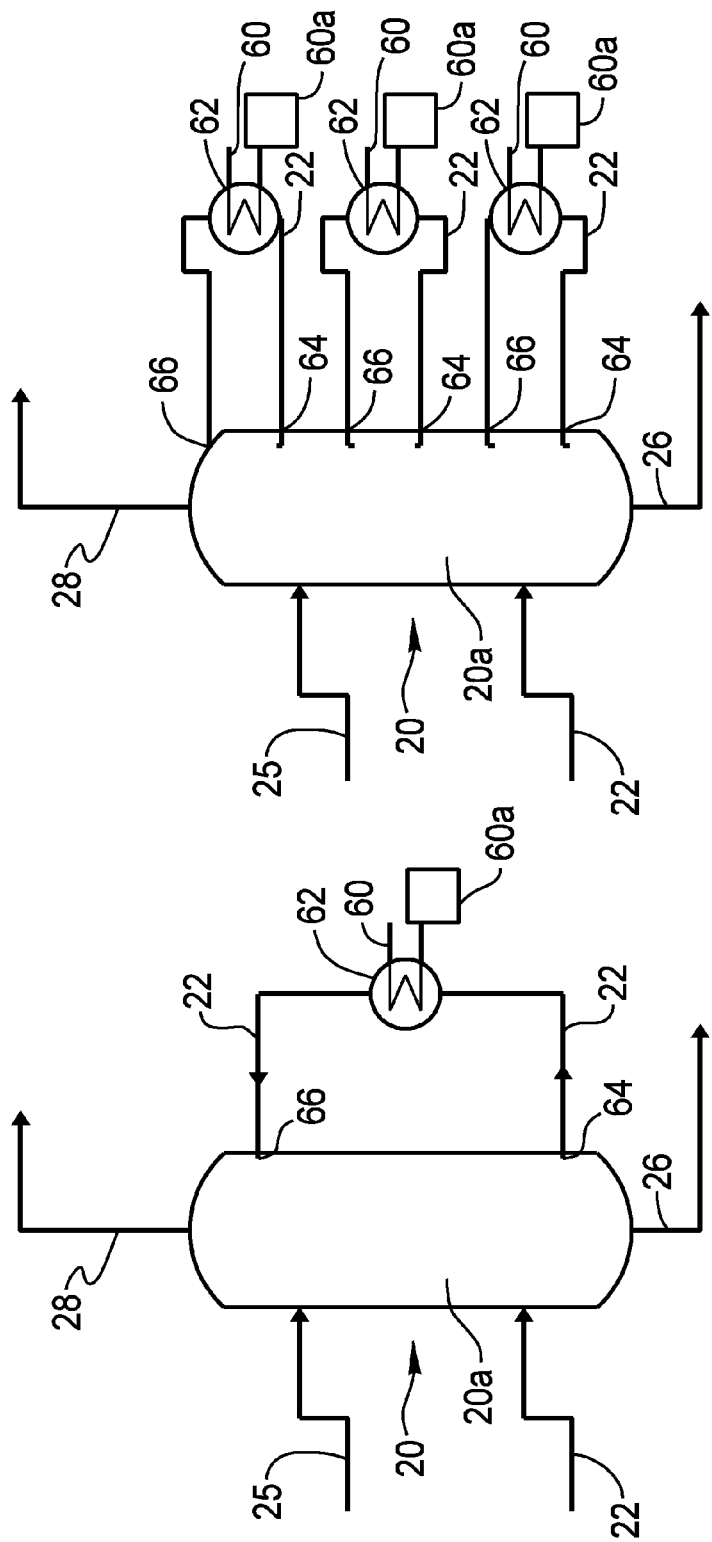

SYSTEM AND METHOD FOR REGENERATION OF AN ABSORBENT SOLUTION

CROSS-REFERENCE TO RELATED APPLICATION

This application claims priority benefit under 35 U.S.C. §119(e) of copending U.S. Provisional Patent Application Ser. No. 61/013,363 filed Dec. 13, 2007, which is hereby incorporated by reference in its entirety.

BACKGROUND OF THE INVENTION

1. Field of the Invention

The disclosed subject matter relates to a system and method for the removal of an acidic component from a process stream. More specifically, the disclosed subject matter relates to a system and method for regeneration of an absorbent solution utilized to absorb an acidic component from a process stream.

2. Description of Related Art

Process streams, such as waste streams from coal combustion furnaces often contain various components that must be removed from the process stream prior to its introduction into an environment. For example, waste streams often contain acidic components, such as carbon dioxide ($CO_2$) and hydrogen sulfide ($H_2S$), that must be removed or reduced before the waste stream is exhausted to the environment.

One example of an acidic component found in many types of process streams is carbon dioxide. Carbon dioxide ($CO_2$) has a large number of uses. For example, carbon dioxide can be used to carbonate beverages, to chill, freeze and package seafood, meat, poultry, baked goods, fruits and vegetables, and to extend the shelf-life of dairy products. Other uses include, but are not limited to treatment of drinking water, use as a pesticide, and an atmosphere additive in greenhouses. Recently, carbon dioxide has been identified as a valuable chemical for enhanced oil recovery where a large quantity of very high pressure carbon dioxide is utilized.

One method of obtaining carbon dioxide is purifying a process stream, such as a waste stream, e.g., a flue gas stream, in which carbon dioxide is a byproduct of an organic or inorganic chemical process. Typically, the process stream containing a high concentration of carbon dioxide is condensed and purified in multiple stages and then distilled to produce product grade carbon dioxide.

The desire to increase the amount of carbon dioxide removed from a process gas stream is fueled by the desire to increase amounts of carbon dioxide suitable for the above-mentioned uses (known as "product grade carbon dioxide") as well as the desire to reduce the amount of carbon dioxide released to the environment upon release of the process gas stream to the environment. Process plants are under increasing demand to decrease the amount or concentration of carbon dioxide that is present in released process gases. At the same time, process plants are under increasing demand to conserve resources such as time, energy and money. The disclosed subject matter may alleviate one or more of the multiple demands placed on process plants by increasing the amount of carbon dioxide recovered from a process plant while simultaneously decreasing the amount of energy required to remove the carbon dioxide from the process gas.

SUMMARY OF THE INVENTION

According to aspects illustrated herein, there is provided a method for regenerating a rich absorbent solution, said method comprising: interacting a process stream comprising an acidic component with an absorbent solution; removing at least a portion of said acidic component from said process stream by absorbing said acidic component, thereby producing a rich absorbent solution and a reduced acidic component stream; providing at least one of said process stream or said reduced acidic component stream to at least one heat exchanger, thereby transferring heat to a heat transfer fluid; and utilizing said heat transfer fluid during regeneration of said rich absorbent solution.

According to other aspects illustrated herein, there is provided a system for regenerating a rich absorbent solution, said system comprising: an absorber facilitating interaction between a process stream and an absorbent solution, wherein said process stream comprises an acidic component, and interaction of said process stream with said absorbent solution produces a reduced acidic component stream and a rich absorbent solution; at least one heat exchanger accepting at least one of said reduced acidic component stream and said process stream to transfer heat to a heat transfer fluid; and at least one mechanism to transfer said heat transfer fluid from said at least one heat exchanger to a regenerator regenerating said rich absorbent solution, wherein each of said at least one mechanisms is fluidly coupled to each of said at least one heat exchangers.

According to other aspects illustrated herein, there is provided an absorber for accepting a process stream, said absorber comprising: an internal portion comprising a top section and a lower section, wherein said lower section is below said top section; a process steam inlet permitting a process stream into said internal portion, wherein said process stream is contacted with an absorbent solution; and a heat exchanger, wherein said heat exchanger is located at a position internal of said absorber, a position external of said absorber, or a combination thereof.

The above described and other features are exemplified by the following figures and detailed description.

BRIEF DESCRIPTION OF THE DRAWINGS

Referring now to the figures, which are exemplary embodiments, and wherein the like elements are numbered alike:

FIGS. 2 and 2A are diagrams depicting examples of embodiments of absorbers utilized in the system shown in FIG. 1;

FIGS. 4 and 4A are diagrams depicting examples of embodiments of absorbers utilized in the system shown in FIG. 1.

DETAILED DESCRIPTION OF PREFERRED EMBODIMENTS

Figure 1:
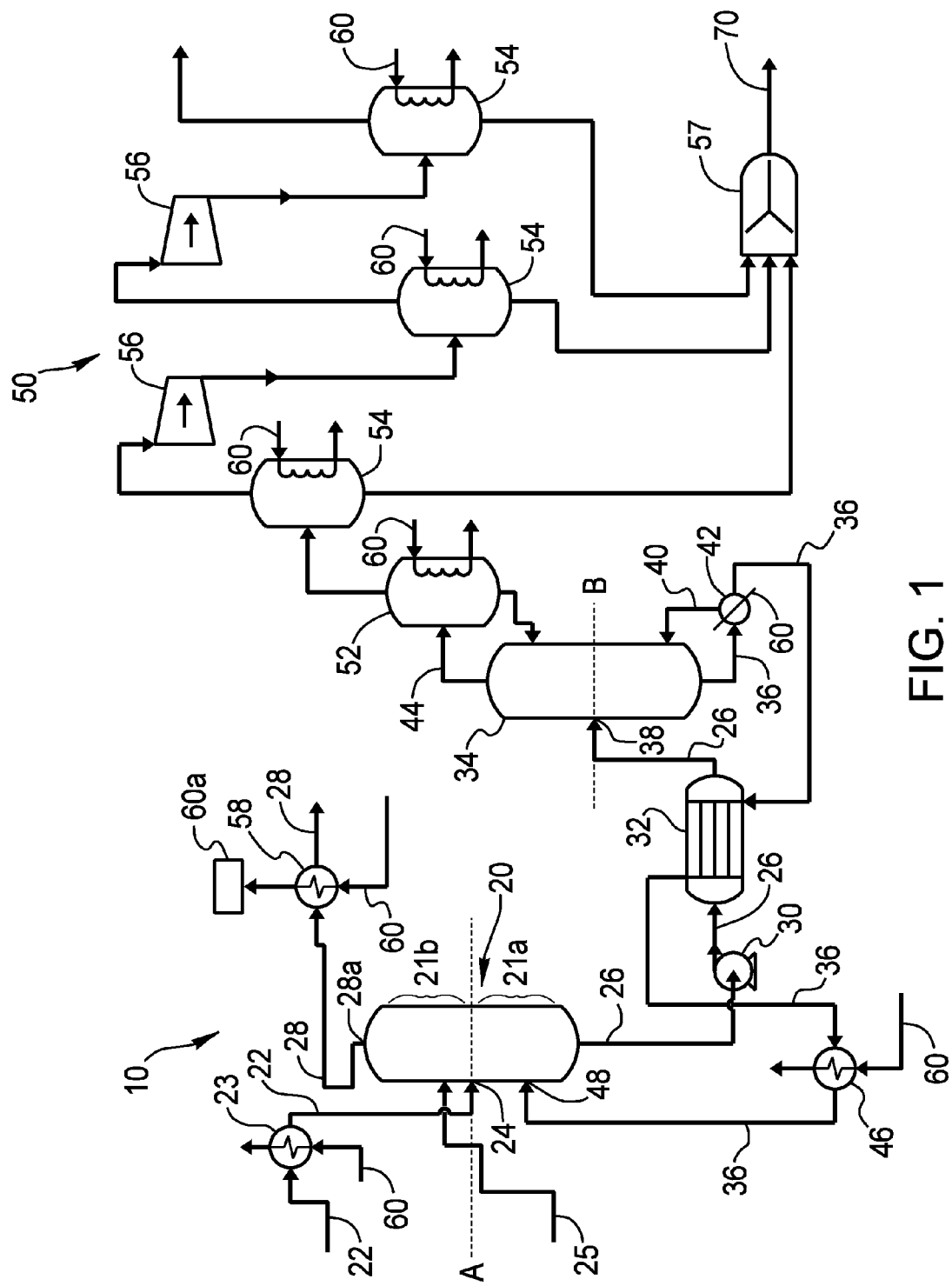
FIG. 1 is a diagram depicting an example of one embodiment of a system for absorbing an acidic component from a process stream and regenerating the absorbent solution used to absorb the acidic component.

FIG. 1 illustrates a system 10 for regenerating a rich absorbent solution produced by absorbing an acidic component from a process stream which thereby forms a reduced-acidic acid component stream and a rich absorbent solution.

System 10 includes an absorber 20, having an internal portion 20a that accepts a process stream 22 and facilitates interaction between the process stream and an absorbent solution (not shown). As shown in FIG. 1, the process stream 22 enters an absorber 20 via a process stream input 24 located, for example, at a mid-point A of the absorber 20 and travels through the absorber 20. However, it is contemplated that the process stream 22 may enter absorber 20 at any location that permits absorption of an acidic component from the process stream, e.g., the process stream inlet 24 may be located at any point on the absorber 20. Mid-point A divides the absorber 20 into a lower section 21a and an upper section 21b.

Process stream 22 may be any liquid stream or gas stream such as natural gas streams, synthesis gas streams, refinery gas or vapor streams, output of petroleum reservoirs, or streams generated from combustion of materials such as coal, natural gas or other fuels. One example of process stream 22 is a flue gas stream generated at an output of a source of combustion of a fuel, such as a synthetic gas, a petroleum refinery gas, natural gas, a fossil fuel such as coal, and the like. Depending on the source or type of process stream 22, the acidic component(s) may be in gaseous, liquid or particulate form.

Process stream 22 typically contains several acidic components, including, but not limited to carbon dioxide. By the time process stream 22 enters the absorber 20, the process stream may have undergone treatment to remove particulate matter as well as sulfur oxides (SOx) and nitrogen oxides (NOx). However, processes may vary from system to system and therefore, such treatments may occur after the process stream 22 passes through the absorber 20, or not at all.

In one embodiment, shown in FIG. 1, the process stream 22 passes through a heat exchanger 23, which facilitates the cooling of the process stream by transferring heat from the process stream to a heat transfer fluid 60. It is contemplated that the heat transfer fluid 60 may be transferred to other sections of system 10, where the heat can be utilized to improve efficiency of the system 10 (as described below).

In one example, the process stream 22 is cooled in heat exchanger 23 from a temperature between one hundred forty nine degrees Celsius and two hundred four degrees Celsius (149° C.-204° C. or 300-400° F.) to a temperature between thirty eight degrees Celsius and one hundred forty nine degrees Celsius (38° C.-149° C. or 100-300° F.). In another example, the process stream 22 is cooled from a temperature between one hundred forty nine degrees Celsius and two hundred four degrees Celsius (149° C.-204° C. or 300-400° F.) to a temperature between thirty eight degrees Celsius and sixty six degrees Celsius (38° C.-66° C. or 100-150° F.). In one embodiment, after passing through the heat exchanger 23, a concentration of the acidic component present in the process stream 22 is about one to twenty percent by mole (1-20% by mole) and the concentration of water vapor present in the process stream in about one to fifty percent by mole (1-50% by mole).

The absorber 20 employs an absorbent solution dispersed therein that facilitates the absorption and the removal of a gaseous component from the process stream 22. In one embodiment, the absorbent solution includes a chemical solvent and water, where the chemical solvent contains, for example, a nitrogen-based solvent, and in particular, primary, secondary and tertiary alkanolamines; primary and secondary amines; sterically hindered amines; and severely sterically hindered secondary aminoether alcohols. Examples of commonly used chemical solvents include, but are not limited to: monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol (also called diethyleneglycolamine or DEGA), 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy)ethanol, 2-(2-(1-methyl-1-ethylpropylamino)ethoxy)ethanol, and the like. The foregoing may be used individually or in combination, and with or without other co-solvents, additives such as anti-foam agents, buffers, metal salts and the like, as well as corrosion inhibitors. Examples of corrosion inhibitors include, but are not limited to heterocyclic ring compounds selected from the group consisting of thiomopholines, dithianes and thioxanes wherein the carbon members of the thiomopholines, dithianes and thioxanes each have independently H, $C_{1-8}$ alkyl, $C_{7-12}$ alkaryl, $C_{6-10}$ aryl and/or $C_{3-10}$ cycloalkyl group substituents; a thiourea-aminne-formaldehyde polymer and the polymer used in combination with a copper (II) salt; an anion containing vanadium in the plus 4 or 5 valence state; and other known corrosion inhibitors.

In one embodiment, the absorbent solution present in the absorber 20 is referred to as a "lean" absorbent solution and/or a "semi-lean" absorbent solution 36. The lean and semi-lean absorbent solutions are capable of absorbing the acidic component from the process stream 22, e.g., the absorbent solutions are not fully saturated or at full absorption capacity. As described herein, the semi-lean absorbent solution is more absorbent than the lean absorbent solution. In one embodiment, described below, the lean and/or semi-lean absorbent solution 36 is provided by the system 10. In one embodiment, a make-up absorbent solution 25 is provided to the absorber 20 to supplement the system provided lean and/or semi-lean absorbent solution 36.

Absorption of the acidic component from the process stream 22 occurs by interaction of the lean and/or semi-lean absorbent solution 36 with the process stream. It should be appreciated that interaction between the process stream 22 and the lean and/or semi-lean absorbent solution 36 can occur in any manner in the absorber 20. However, in one example, the process stream 22 enters the absorber 20 through the process stream inlet 24 and travels up the length of the absorber while the lean and/or semi-lean absorbent solution enters the absorber at a location above where the process stream enters and flows in a countercurrent direction of the process stream 22.

Interaction within absorber 20 between process stream 22 and lean and/or semi-lean absorbent solution 36 produces a rich absorbent solution 26 from the lean and/or semi-lean absorbent solution and process stream having a reduced amount of the acidic component. Rich absorbent solution 26 is saturated with the acidic component absorbed from process stream 22. In one embodiment, rich absorbent solution 26 is saturated with carbon dioxide.

In one example, rich absorbent solution 26 falls to lower section 21a of absorber 20, where it is removed for further processing, while process stream 22 now having a reduced amount of acidic component travels vertically through the absorber and is released as a reduced acidic component stream 28 from upper section 21b of absorber 20 via an outlet 28a, the reduced acidic component stream having a temperature between forty nine degrees Celsius and ninety three degrees Celsius (49° C.-93° C. or 120° F.-200° F.). In one example, the concentration of acidic component present in reduced acidic component stream 28 is between zero and fifteen percent (0-15%) by mole. In one example, the concentration of carbon dioxide present in the reduced acidic component stream 28 is between zero and fifteen percent (0-15%) by mole.

As shown in FIG. 1, the rich absorbent solution 26 proceeds through a pump 30 (24-160 psi) to a heat exchanger 32 before reaching a regenerator 34. Regenerator 34, which may also be referred to as a "stripper", regenerates rich absorbent solution 26 to form one of the lean absorbent solution and/or the semi-lean absorbent solution 36. In one embodiment, described below, the lean and/or semi-lean absorbent solution is feedback to the absorber 20.

As shown in FIG. 1, rich absorbent solution 26 may enter the regenerator 34 at an inlet 38, which is located at midpoint B of the regenerator 34. However, it is contemplated that rich absorbent solution 26 can enter regenerator 34 at any location which would facilitate the regeneration of the rich absorbent solution, i.e., inlet 38 can be positioned at any location on regenerator 34.

After entering regenerator 34, rich absorbent solution 26 interacts with (or contacts) a countercurrent flow of steam 40 that is produced by a reboiler 42 that is fluidly coupled to regenerator 34. In one embodiment, regenerator 34 has a pressure between about twenty-four and one hundred sixty (24-160) psi and is operated in a temperature range between thirty eight degrees Celsius and two hundred four degrees Celsius (38° C.-204° C. or 100° F.-400° F.), more particularly in a temperature range between ninety three degrees Celsius and one hundred ninety three degrees Celsius (93° C.-193° C. or 200° F.-380° F.). It should be appreciated that the term "fluidly coupled" as used herein indicates that the device is in communication with or is otherwise connected, e.g., either directly (nothing between the two devices) or indirectly (something present between the two devices), to another device by pipes, conduits, conveyors, wires, and the like.

In regenerator 34, steam 40 regenerates rich absorbent solution 26, thereby forming lean absorbent solution and/or the semi-lean absorbent solution 36 as well as an acidic component-rich stream 44. At least a portion of lean absorbent solution and/or the semi-lean absorbent solution 36 is transferred to absorber 20 for further absorption and removal of the acidic component from process stream 22, as described above.

In one embodiment, lean absorbent solution and/or the semi-lean absorbent solution 36 travel through a treatment train prior to entering absorber 20. In one embodiment, as shown in FIG. 1, lean absorbent solution and/or the semi-lean absorbent solution 36 are passed through heat exchanger 32 and a heat exchanger 46 prior to entering the absorber 20 via an inlet 48. The lean absorbent solution and/or the semi-lean absorbent solution 36 is cooled by passing through heat exchanger 46 such that heat is transferred to a heat transfer liquid, e.g., the heat transfer liquid 60. As described above, heat transfer liquid 60 may be transferred to other locations within system 10 in order to utilize the heat therein and thus improve the efficiency of the system by, for example, conserving and/or re-using energy produced therein.

It is contemplated that lean absorbent solution and/or the semi-lean absorbent solution 36 may pass through other devices or mechanisms such as, for example, pumps, valves, and the like, prior to entering the absorber 20. FIG. 1 illustrates the inlet 48 at a position below the process stream inlet 24, however, it is contemplated that the inlet 48 may be located at any position on the absorber 20.

Referring back to the acidic component-rich stream 44, FIG. 1 illustrates acidic component rich stream 44 leaving regenerator 34 and passing through a compressing system shown generally at 50. In one embodiment, compressing system 50 includes one or more condensers 52 and flash coolers 54, one or more compressors 56 as well as a mixer 57. Condensers 52 facilitate condensing water vapor, which liberates heat (energy) manifested in an elevated water temperature. The heated water may be used as a heat source. Compressors 56 compress the carbon dioxide, which liberates heat manifested a heated gas temperature, which can be used as a heat source.

The compressing system 50 facilitates the condensation, cooling and compression of acidic component rich stream 44 into an acidic component stream 70 for future use or storage. In one embodiment, the temperature in a first flash cooler 54 is in the range between thirty eight degrees Celsius and sixty six degrees Celsius (38° C.-66° C. or 100° F.-150° F.) and a pressure drop of 5-10 psi. Acidic component rich stream 44 is transferred from first flash cooler 54 to a first compressor 56 where it is compressed at 490 psi and then cooled in a second flash cooler 54 to a temperature between thirty eight degrees Celsius and sixty six degrees Celsius (38° C.-66° C. or 100° F.-150° F.). Acidic rich component stream 44 is cooled in a third flash cooler 54 to a temperature between thirty eight degrees Celsius and sixty six degrees Celsius (38° C.-66° C. or 100° F.-150° F.) and the pressure drop is 5-10 psi.

While FIG. 1 illustrates compressing system 50 having particular devices and mechanisms, it is contemplated that the compressing system can be configured in any manner useful for the application for which the system 10 is employed. It is also contemplated that system 10 does not include compressing system 50 and, instead, stores acidic component rich stream 44 leaving regenerator 34 for future use.

In one embodiment, illustrated in FIG. 1, condenser 52 and flash coolers 54 extract heat from acidic component rich stream 44 to cool the stream to a temperature between of, for example, about thirty eight degrees Celsius and eighty two degrees Celsius (38° C.-82° C. or 100° F.-180° F.) before it enters compressors 56. The heat is extracted in condenser 52 and flash cooler 54 by circulating a heat transfer liquid 60 through the condenser and/or flash cooler. In one embodiment, heat transfer liquid 60 from condenser 52 and/or flash cooler 54 may be transferred to reboiler 42 to be utilized in the regeneration of rich absorbent solution 26.

In one embodiment, reboiler 42 may utilize heat (energy) transferred to heat transfer fluid 60 in heat exchanger 32 of system 10 in order to produce steam 40 to regenerate rich absorbent 26. Utilization of heat transferred to heat transfer fluid 60 reduces, or eliminates, the amount of energy required to be used from an outside source to power reboiler 42 and thereby produce steam 40. By reducing or eliminating the amount of outside energy used to power reboiler 42, resources, e.g., manpower, money, time, power, utilized by system 10 may be used more efficiently, i.e., decreased.

As shown in FIG. 1, in one embodiment, reduced acidic component stream 28 is removed from absorber 20 and is provided to a heat exchanger 58. Heat exchanger 58 accepts reduced acidic component stream 28 by being fluidly coupled to absorber 20. In one embodiment, reduced acidic component stream 28 has a temperature between, for example, about fifty four degrees Celsius and ninety three Celsius (54° C.-93° C. or 130-200° F.). In another embodiment, reduced acidic component stream 28 has a temperature in a range of between forty nine degrees Celsius and seventy one degrees Celsius (49° C.-71° C. or 120° F.-160° F.). In another embodiment, reduced acidic component stream 28 has a temperature between about fifty four degrees Celsius and seventy one degrees Celsius (54° C.-71° C. or 130° F.-160° F.). The heat (energy) extracted from the reduced acidic component stream 28 is transferred to heat transfer liquid 60 by passing reduced acidic component stream 28 through heat exchanger 58. In one embodiment, heat transfer liquid 60 can be boiler feed water or any other liquid or chemical capable of use in a heat exchanger. For example, in one embodiment, heat transfer liquid 60 is utilized to regenerate rich absorbent solution 26 by providing heat transfer liquid 60 to reboiler 42.

In one embodiment, heat exchanger 58 is fluidly coupled to a mechanism 60a that facilitates transfer of heat transfer fluid 60 to reboiler 42. Mechanism 60a may be any mechanism that facilitates transfer of heat transfer fluid 60 to reboiler 42, including, but not limited to, conduits, piping, conveyors, or the like. Mechanism 60a may be controlled by valves, transducers, logic, or the like.

Figure 2:
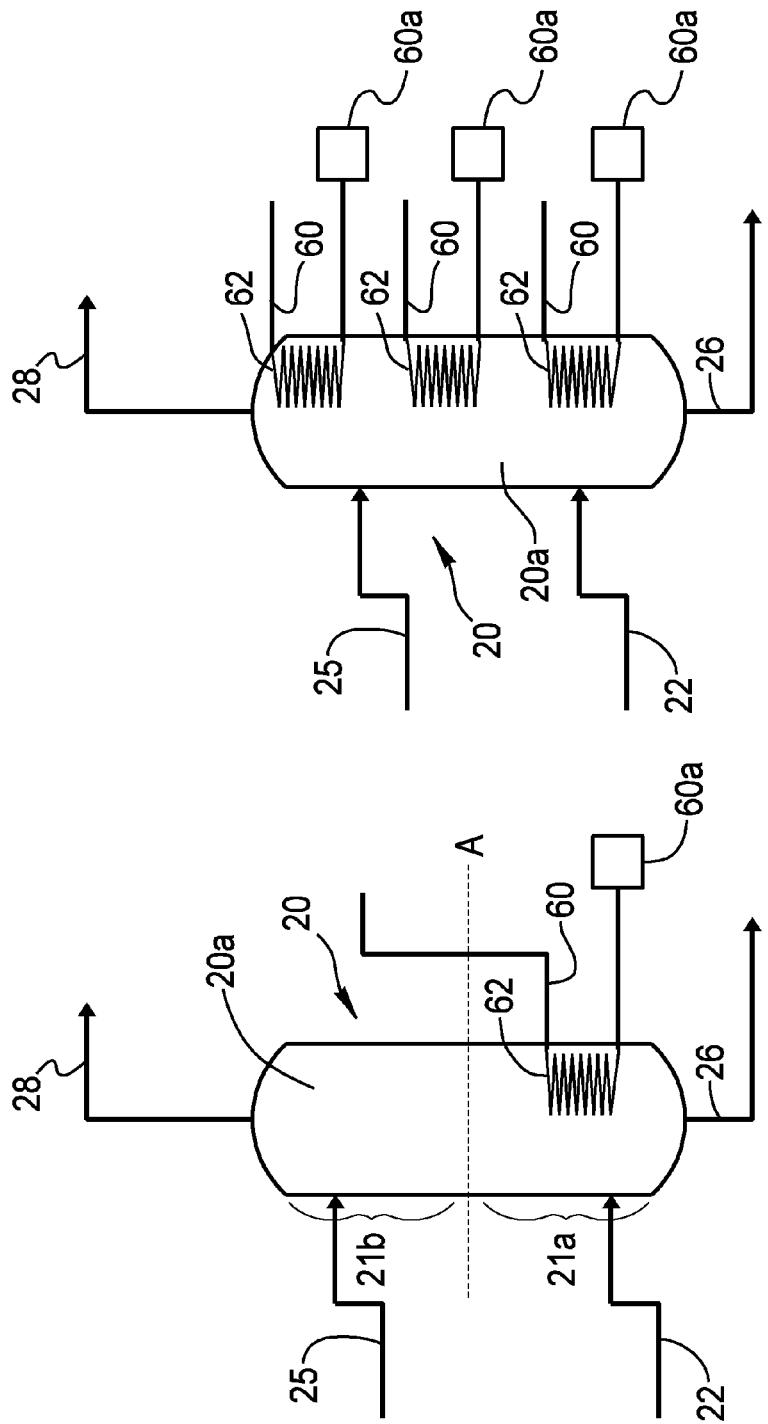

In one embodiment illustrated in FIG. 2, a heat exchanger 62 is disposed within an internal location of absorber 20. For example, heat exchanger 62 is located at a position in internal portion 20a of absorber 20. In one embodiment, heat exchanger 62 is in a position selected from the lower section 21a, the upper section 21b, or a combination thereof. As shown in FIG. 2, heat exchanger 62 is located in the lower section 21a of absorber 20 and accepts process stream 22 and heat transfer fluid 60 by being positioned in internal portion 20a of absorber 20.

In another embodiment, shown in FIG. 2A, a plurality of the heat exchangers 62 are positioned within internal portion 20a of absorber 20. As shown in FIG. 2A, three of the heat exchangers 62 are positioned within absorber 20, for example, a first one positioned in the lower section 21a of absorber 20, a second one positioned so that a portion of the heat exchanger 62 is in the lower section 21a of absorber 20 and at least a portion of the heat exchanger 62 is in the upper section 21b of absorber 20, and a third one of the heat exchangers 62 is positioned in the upper section 21b of absorber 20.

While FIGS. 2 and 2A illustrate one or three of the heat exchangers 62 positioned within internal portion 20a of absorber 20, it is contemplated that any number of heat exchangers 62 can be placed in the absorber.

Still referring to FIGS. 2 and 2A, in one embodiment, each of the heat exchangers 62 is fluidly coupled to mechanism 60a to transfer heat to heat transfer fluid 60, whereby heat transfer fluid 60 is utilized in the regeneration of rich absorbent solution 26. As described above, mechanism 60a facilitates transfer of heat transfer fluid 60 from heat exchangers 62 to reboiler 42.

Figure 3:
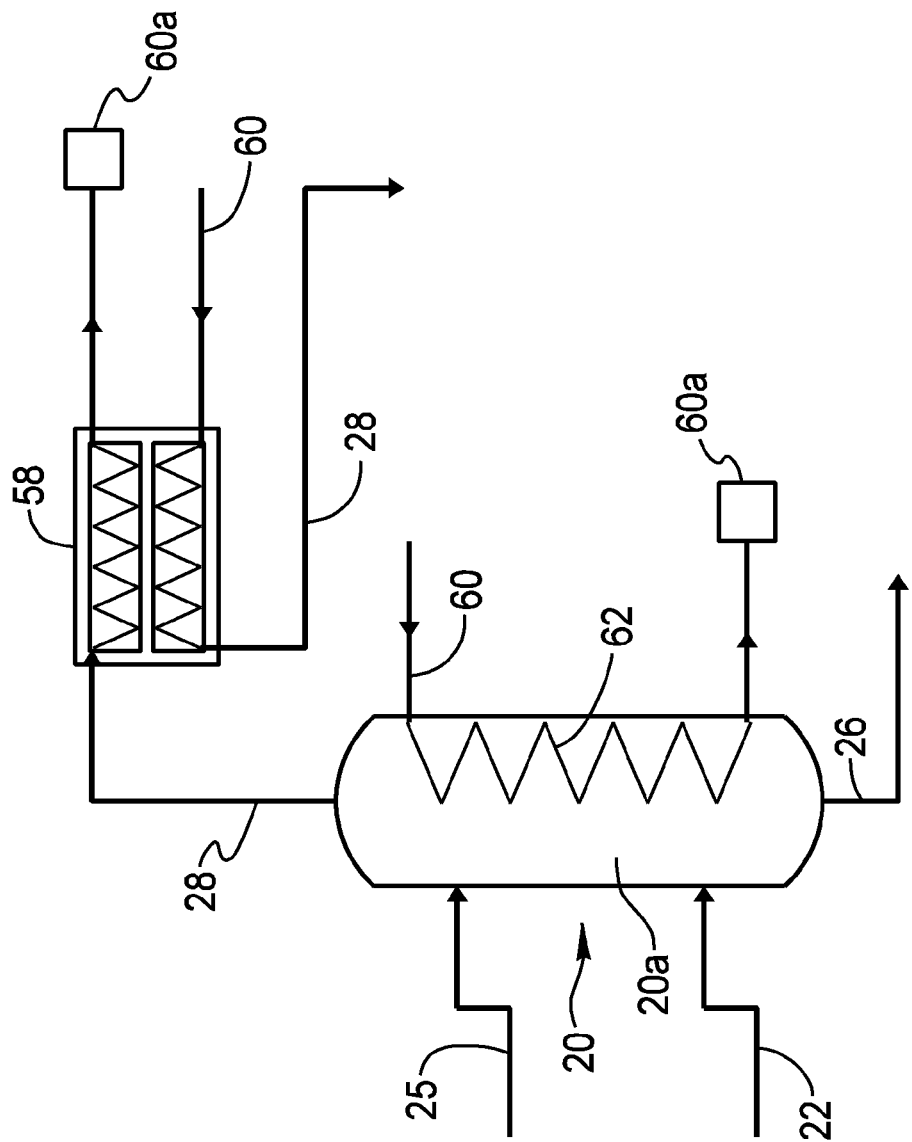
FIGS. 3 and 3A are diagrams depicting examples of embodiments of absorbers utilized in the system shown in FIG. 1.
Figure 3A:
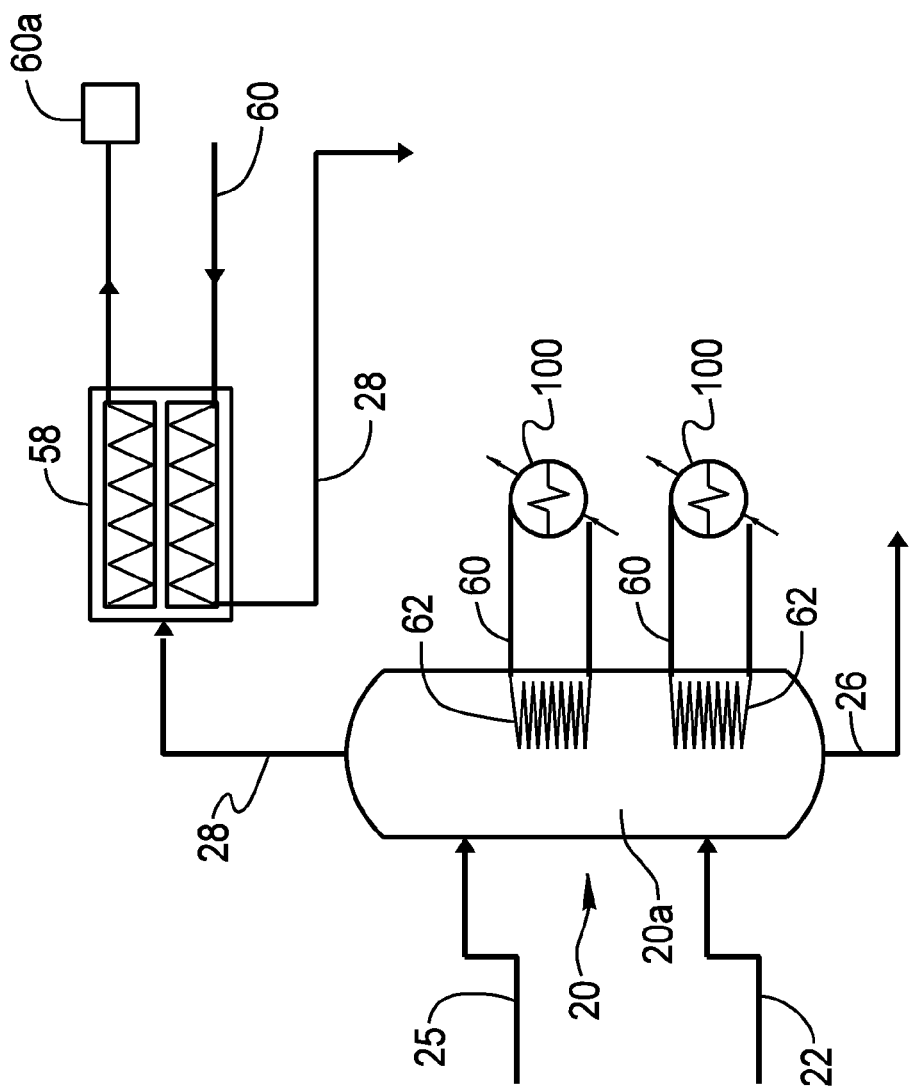

Now referring to FIGS. 3 and 3A, in one embodiment, absorber 20 may include one or more of heat exchangers 62 in internal portion 20a of the absorber, as well as at least one of the heat exchanger 58 in a location external of absorber 20. As shown in FIG. 3, one of the heat exchangers 62 is in internal portion 20a of absorber 20 and accepts process stream 22. In another embodiment, as shown in FIG. 3A, a plurality of the heat exchangers 62 may be in internal portion 20a of absorber 20. In both FIGS. 3 and 3A, for example, absorber 20 is fluidly coupled to the heat exchanger 58 located externally thereto. Heat exchanger 58 accepts reduced acidic component stream 28 from absorber 20 as being fluidly coupled to absorber 20 at a point where the reduced acidic component stream exits absorber 20. As shown in FIG. 3A, a controller heat exchanger 100 may be associated with each of heat exchangers 62 through a loop that provides the heat transfer fluid 60, thereby providing temperature control.

In another embodiment, shown in FIG. 4, absorber 20 includes a heat exchanger 62 located at a position external of the absorber. Absorber 20 is fluidly coupled to the heat exchanger 62 and the heat exchanger 62 accepts process stream 22. As shown in FIG. 4, process stream 22 exits absorber 20 via an outlet 64 and re-enters absorber 20 via an inlet 66. In FIG. 4A, absorber 20 is fluidly coupled to a plurality of external heat exchangers 62 (e.g., three heat exchangers 62 illustrated). Absorber 20 includes a plurality of outlets 64 and a plurality of inlets 66 such that each of the external heat exchangers 62 accepts a portion of process stream 22 via one of the outlets 64 and returns the process stream 22 to the absorber via one of the inlets 66 associated therewith.

While FIGS. 4 and 4A illustrate only one or three of the heat exchangers 62 coupled externally to absorber 20, it is contemplated that any number of heat exchangers can be fluidly coupled externally to absorber 20.

Figure 5:
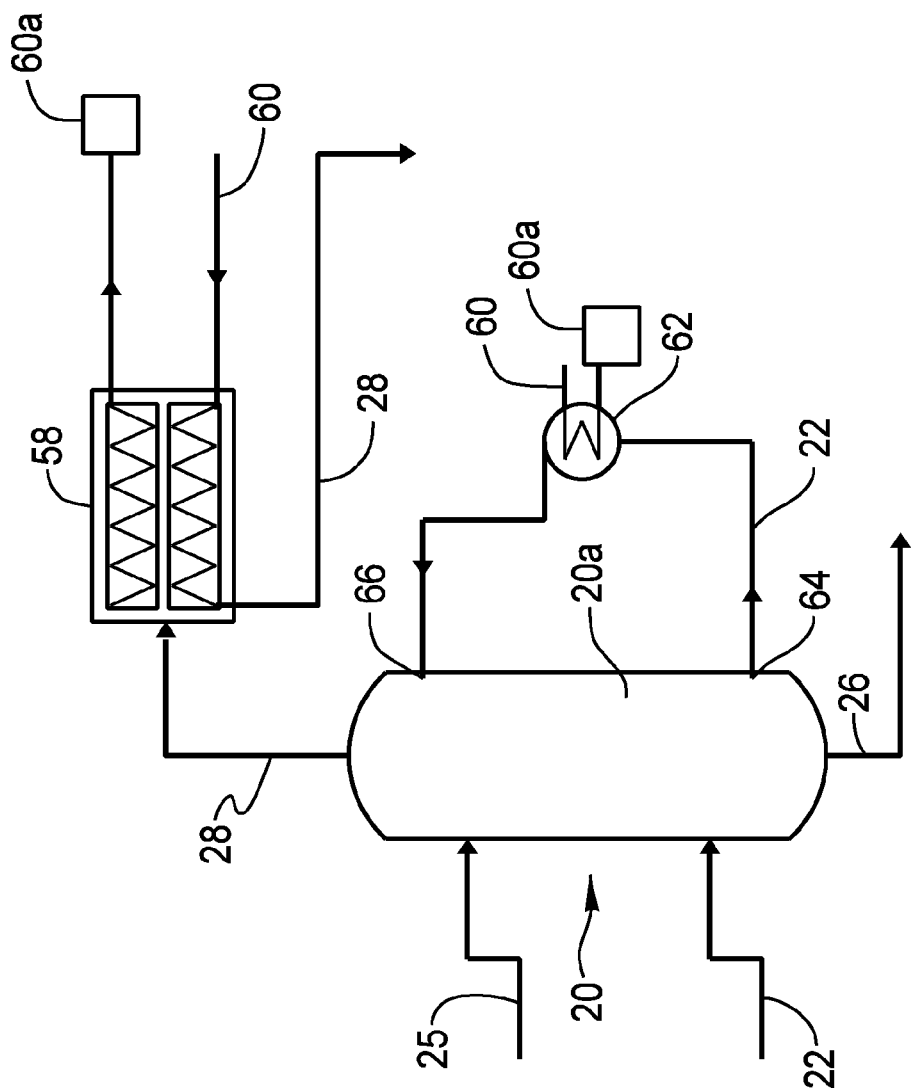
FIG. 5 is a diagram depicting an example of one embodiment of an absorber utilized in the system shown in FIG. 1.

In yet another embodiment, shown in FIG. 5, absorber 20 may have the heat exchanger 62 located in internal portion 20a of absorber 20 and the heat exchanger 58 located at a position external of absorber 20. Heat exchanger 62 is fluidly coupled to absorber 20 and accepts process stream 22 from absorber 20. The heat exchanger 58 is fluidly coupled to absorber 20 and accepts reduced acidic component stream 28 from absorber 20. While FIG. 5 illustrates only one heat exchanger 62 and one heat exchanger 58 coupled externally of absorber 20, it is contemplated that there may be a plurality of heat exchangers 62 accepting portions of process stream 22 and a plurality of heat exchangers 58 accepts a portion of reduced acidic component stream 28 from absorber 20.

It should be appreciated that an amount of energy required by or given to reboiler 42 (FIG. 1) for regenerating rich absorbent solution 26 (also known as "reboiler duty") by a source outside system 10 is replaced, or reduced, by the aforementioned heat transferred by the heat transfer fluid 60 to the reboiler 42. As described herein, heat transfer fluid 60 may be transferred from one or more of the heat exchanger 23, the heat exchanger 46, the heat exchanger 58, or the heat exchanger 62 to the reboiler 42.

In one embodiment, the heat transferred from reduced acidic component stream 28 to heat transfer fluid 60 via heat exchanger 58 located at a position external of absorber 20, as shown in FIG. 1, may provide about ten to fifty percent (10-50%) of the reboiler duty. In one embodiment, the heat transferred to heat transfer fluid 60 via a single one of the heat exchangers 62 in an internal portion 20a of absorber 20, as shown in FIG. 2, may provide about ten to thirty percent (10-30%) of the reboiler duty as compared to when more than one of the heat exchangers 62 is positioned internally in absorber 20, wherein each of the heat exchangers 62 provides about one to twenty percent (1-20%) of the reboiler duty and, more particularly, about five to fifteen percent (5-15%) of the reboiler duty, with a cumulative heat transfer, i.e., from all of the heat exchangers 62, providing about one to fifty percent (1-50%) of reboiler duty.

Heat transferred to reboiler 42 in system 10 that includes at least one of the heat exchangers 62 located in the internal portion 20a of absorber 20 and at least one of the heat exchangers 58 accepting reduced acidic component stream 28 fluidly coupled externally to the absorber, as shown in FIGS. 3 and 3A, provides about one to fifty percent (1-50%) of the reboiler duty, and more particularly provides about five to forty percent (5-40%) of the reboiler duty.

Heat transferred to reboiler 42 in a system 10 that includes a single heat exchanger 62 accepting process stream 22 and fluidly coupled at an external position of absorber 20, as shown in FIG. 4, provides about one to fifty percent (1-50%) of the reboiler duty and, more particularly, provides about ten to thirty percent (10-30%) of the reboiler duty. If more than one of the heat exchangers 62 are fluidly coupled at an external position of absorber 20, as shown in FIG. 4A, the heat transferred from process stream 22 to the heat transfer fluid 60 in each of the heat exchangers 62 provides about one to twenty percent (1-20%) of the reboiler duty and, more particularly, about five to fifteen percent (5-15%) of the reboiler duty, with a cumulative heat transfer, i.e., from all of the heat exchangers 62, providing about one to fifty percent (1-50%) of the reboiler duty.

Heat transferred from a system 10 including at least one of the heat exchangers 62 accepting process stream 22 and located at an external position of absorber 20, as well as the heat exchanger 58 accepting reduced acidic component stream 28, as shown in FIG. 5, provides about one to fifty percent (1-50%) of the reboiler duty and, more particularly, about five to forty percent (5-40%) of the reboiler duty.

Heat transferred from one or more of the condensers 52 via heat transfer fluid 60 to the reboiler 42 may provide about ten to sixty percent (10-60%) of the reboiler duty. In another example, the heat transferred from one or more of the condensers 52 may provide about ten to fifty percent (10-50%) of the reboiler duty.

Heat transferred from each of the flash coolers 54 via heat transfer fluid 60 to reboiler 42 may provide about one to ten percent (1-10%) of the reboiler duty. In another example, the heat transferred from each of the flash coolers 54 may provide about one to five percent (1-5%) of the reboiler duty. Heat may also be transferred from condensers 56 to reboiler 42.

In use, to regenerate rich absorbent solution 26 by the above-described system 10, a method includes interacting process stream 22 having an acidic component therein with an absorbent solution, such as the aforementioned lean and/or semi-lean absorbent solution 36 the make-up absorbent solution 25 or combination thereof. Interaction between process stream 22 and the absorbent solution may occur in absorber 20. The interaction between process stream 22 and the absorbent solution results in removing at least a portion of the acidic component from the process stream. The acidic component is removed from process stream 22 by absorbing the acidic component from the process stream, thereby producing rich absorbent solution 26 and reduced acidic component stream 28.

Process stream 22 and reduced acidic component stream 28 are typically at a high temperature. In order to transfer heat from process stream 22 and/or reduced acidic component stream 28, either the process stream or the reduced acidic component stream, or both, is provided to at least one heat exchanger, thereby transferring heat to the aforementioned heat transfer fluid 60.

As described in more detail above, there are many manners for providing process stream 22 and/or reduced acidic component stream 28 to at least one heat exchanger. For example, at least one of the heat exchangers 62 may be located in the internal portion 20a of absorber 20, which accepts at least a portion of process stream 22 (see FIGS. 2 and 2A). In another example, shown in FIGS. 3 and 3A, at least one of the heat exchangers 62 accepts process stream 22 and is located in the internal portion 20a of absorber 20, while at least one of the heat exchangers 58 accepts reduced acidic component stream 28 and is located at an external position of absorber 20. In yet another example, shown in FIGS. 4 and 4A, at least one of the heat exchangers 62 accepts process stream 22 and is located at a position external of absorber 20. In still a further example, shown in FIG. 5, at least one of the heat exchangers 62 accepts the process stream 22 and is located at a position external of absorber 20 and at least one of the heat exchanger 58 accepts reduced acidic component stream 28 and is located at a position external of absorber 20. It should be appreciated that while not shown, other manners for providing either or both of process stream 22 and the reduced acidic component stream 28 to at least one heat exchanger coupled internally within or externally to the absorber, are contemplated and encompassed by the disclosure herein.

Once either process stream 22 or reduced acidic component stream 28 is provided to a heat exchanger, the heat transfer fluid 60 comes into contact, either directly or indirectly, with the process stream or the reduced acidic component stream, thereby transferring heat from the process stream or reduced acidic component stream to the heat transfer fluid. The heat transfer fluid is utilized to regenerate rich absorbent solution 26 by transferring the heat transfer fluid to reboiler 42 and providing the reboiler with energy to produce the steam 40, the steam 40 then regenerates rich absorbent solution 26.

Non-limiting examples of the system(s) and process(es) described herein are provided below. Unless otherwise noted, temperatures are in Celsius (° C.) and amounts are in mole percent (% mole).

EXAMPLES

Example 1

One embodiment of a plant layout is shown in FIG. 1. The reduced acidic component stream from an absorber has a concentration of $CO_2$ between about one and fifteen mole percent (1-15% mole), i.e., about 85-99% of carbon dioxide present in the process stream has been removed. The reduced acidic component stream has a temperature between forty degrees Celsius and ninety three degrees Celsius (49° C.-93° C. or 120° F.-200° F.). The reduced acidic component stream contains water vapor, and other non-reactive gas with amines. The reduced acidic component stream is cooled to a temperature between forty nine degrees Celsius and seventy one degrees Celsius (49° C.-71° C. or 120° F.-60° F.). The regenerator is operated at about one hundred fifty-five (155) psi. Heat is extracted from the heat exchangers 23, 46 and 58, the compressors 56, the condenser 52, and flash-coolers 54 and utilized by the reboiler 42. The typical energy extracted is shown as percentage of reboiler duty in Table 1, provided below.

TABLE 1

| Equipment | Flowsheet Reference Number | % Reboiler Duty |
| --- | --- | --- |
| Heat Exchanger Prior to Absorber | 23 | 25.13 |
| Heat Exchanger adapted to accept reduced acidic component stream | 58 | 30.1 |
| Compressor 1/Condenser | 56 | 2.75 |
| Compressor 2/Condenser | 56 | 2.56 |
| Heat exchanger for lean and semi-lean absorbent solution | 46 | 13.0 |
| Regenerator condenser | 52 | 34.8 |
| Flash-Cooler1 | 54 | 7.48 |
| Flash-Cooler2 | 54 | 3.41 |
| Flash-Cooler3 | 54 | 4.92 |

Example 2

A system having two heat exchangers located external to an absorber to accept a process stream from an absorber is employed. The system also includes a heat exchanger located external to the absorber to accept a reduced acidic-stream from the absorber.

The reduced acidic component stream from the absorber has a concentration of carbon dioxide ($CO_2$) between one and fifteen percent by mole (1-15% by mole) of the process stream initially provided to the absorber, i.e., about 85% to 99% of the carbon dioxide is removed from the process stream. The reduced acidic component stream has a temperature between forty nine degrees Celsius and ninety three degrees Celsius (49° C.-93° C. or 120° F.-200° F.).

The process stream present in the lower section of the absorber is removed from two locations of the absorber, referred to in the art as "theoretical stage-1 and stage-2" or "equilibrium stages", in which it is assumed the vapor in the absorber is in dynamic equilibrium with the liquid. The process stream removed from the absorber is transferred to a heat exchanger, where a heat transfer fluid is introduced to cool the hot process stream.

The cooled process stream is then reintroduced to the absorber at the same location it was taken out. The cooled process stream that is reintroduced to the absorber from the heat exchanger is in the temperature range of between forty nine degrees Celsius and fifty four degrees Celsius (49° C.-54° C. or 120° F.-130° F.).

The reduced acidic component stream contains water vapor, and other non-reactive gas with amines and is cooled in a heat exchanger to a temperature range of about thirty eight degrees Celsius to forty nine degrees Celsius (38° C.-49° C. or 100° F.-120° F.).

Heat is extracted from the above-mentioned heat exchangers as well as other heat exchangers utilized in the system, condensers, compressors and flash-coolers. The typical energy extracted is shown as a percentage of reboiler duty in Table 2, provided below.

TABLE 2

| Equipment | Flowsheet Reference Number | % Reboiler Duty |
| --- | --- | --- |
| Flue Gas cooling | 23 | 20.1 |
| Absorber flue gas cooler | 58 | 10.10 |
| Compressor1/Condenser | 56 | 2.5 |
| Compressor2/Condenser | 56 | 2.39 |
| Lean cooler | 46 | 8.38 |
| Regenerator condenser | 52 | 49.2 |
| Flash-Cooler1 | 54 | 7.7 |
| Flash-Cooler2 | 54 | 2.34 |
| Falsh-Cooler3 | 54 | 5.5 |
| Intercooler1 | 62 | 10.4 |
| Intercooler 2 | 62 | 10.4 |

Unless otherwise specified, all ranges disclosed herein are inclusive and combinable at the end points and all intermediate points therein. The terms "first," "second," and the like, herein do not denote any order, sequence, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for regenerating a rich amine solution, the method comprising:
    interacting a process stream comprising an acidic component with a lean amine solution in an absorber;
    removing at least a portion of the acidic component from the process stream by absorbing the acidic component into the lean amine solution within the absorber, thereby producing a rich amine solution, a reduced acidic component stream, and heat;
    providing at least one of the process stream and the reduced acidic component stream to at least one heat exchanger, thereby transferring the heat to a heat transfer fluid to produce a heated heat transfer fluid; and
    regenerating the rich amine solution by heating the rich amine solution in a regenerator to create the lean amine solution and a rich stream of the acidic component, wherein heat from the heated heat transfer fluid is used in the regenerating.

2. The method of claim 1, wherein the rich amine solution is heated by steam produced in a reboiler and the heat from the heated heat transfer fluid is provided to the reboiler.

3. The method of claim 1, wherein the amine solution comprises a chemical solvent selected from the group of monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol, 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy)ethanol, or 2-(2-(1-methyl-1-ethylpropylamino)ethoxy)ethanol.

4. The method of claim 1, wherein the at least one heat exchanger is disposed within the absorber.

5. The method of claim 4, further comprising:
    adjusting an amount of heat transferred to the heat transfer fluid by the at least one heat exchanger.

6. The method of claim 1, wherein the at least one heat exchanger is external to the absorber.

7. The method of claim 6, wherein the reduced acidic component stream is provided to the at least one heat exchanger.

8. The method according to claim 6, further comprising:
    withdrawing a portion of the rich amine solution from the absorber,
    providing the withdrawn rich amine solution to the at least one heat exchanger thereby creating a cooled rich amine solution, and
    returning the cooled rich amine solution to the absorber.

9. The method of claim 8, further comprising:
    adjusting an amount of heat transferred to the heat transfer fluid by the at least one heat exchanger.

10. The method of claim 1, wherein the at least one heat exchanger includes:
    a heat exchanger disposed within the absorber, and
    a heat exchanger external to the absorber.

11. The method of claim 10, further comprising:
    adjusting an amount of heat transferred to the heat transfer fluid by at least one of:
    the heat exchanger disposed within the absorber and the heat exchanger external to the absorber.

12. The method of claim 1, wherein the process stream is a flue gas stream generated by combustion of a fossil fuel.

13. A system for regenerating a rich amine solution, the system comprising:

an absorber including a process stream inlet, a lean amine solution inlet, a reduced acidic stream outlet, and a rich amine solution outlet, the absorber being configured to interact the process stream with the lean amine solution to provide the rich amine solution, the reduced acidic component stream, and heat;

at least one heat exchanger arranged to transfer the heat to a heat transfer fluid to produce a heated heat transfer fluid; and a regenerator including a rich amine solution inlet, a lean amine solution outlet, and an outlet for a rich stream of an acidic component, the regenerator being configured to heat the rich amine solution to create the lean amine solution and the rich stream of the acidic component; and a reboiler configured to transfer the heat from the heat transfer fluid to the rich amine solution in the regenerator.

14. The system of claim 13, wherein the amine solution comprises a chemical solvent selected from the group of monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol, 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy)ethanol, or 2-(2-(1-methyl-1-ethylpropylamino)ethoxy)ethanol.

15. The system of claim 13, wherein the at least one heat exchanger is disposed within the absorber.

16. The system of claim 13, wherein the at least one heat exchanger is external to the absorber.

17. The system of claim 16, wherein the at least one heat exchanger is arranged to receive the reduced acidic component stream.

18. The system of claim 13, wherein the absorber further includes a second rich solution outlet in fluid communication with the at least one heat exchanger and a rich solution inlet in fluid communication with the at least one heat exchanger.

19. The system of claim 13, wherein the at least one heat exchanger includes: a heat exchanger disposed within the absorber, and a heat exchanger external to the absorber.

20. The system of claim 13, wherein the process stream is a flue gas stream generated by combustion of a fossil fuel.

* * * * *